United States Patent
Bao et al.

(10) Patent No.: US 12,536,089 B2
(45) Date of Patent: Jan. 27, 2026

(54) APPLICATION ERROR LOG ANALYSIS AND RESOLUTION USING LARGE LANGUAGE MODELS AND ENTITY MATCHING

(71) Applicant: SAP SE, Walldorf (DE)

(72) Inventors: Xingce Bao, Singapore (SG); Bee Huang Tan, Singapore (SG); Ki In Tan, Singapore (SG); Rajesh Vellore Arumugam, Singapore (SG); Yi Quan Zhou, Singapore (SG)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 18/422,144

(22) Filed: Jan. 25, 2024

(65) Prior Publication Data

US 2025/0245120 A1 Jul. 31, 2025

(51) Int. Cl.
*G06F 11/34* (2006.01)
*G06F 40/20* (2020.01)

(52) U.S. Cl.
CPC .......... *G06F 11/3476* (2013.01); *G06F 40/20* (2020.01)

(58) Field of Classification Search
CPC .............................. G06F 11/3476; G06F 40/20
USPC ......................................................... 717/124
See application file for complete search history.

(56) References Cited

U.S. PATENT DOCUMENTS

| | | | |
|---|---|---|---|
| 11,914,465 B2* | 2/2024 | Haririan | G06N 20/00 |
| 12,210,858 B1* | 1/2025 | Silver | G06F 8/77 |
| 2002/0099875 A1* | 7/2002 | Locklear | G06F 11/325 |
| | | | 714/E11.201 |

OTHER PUBLICATIONS

Perez, Fábio, and Ian Ribeiro. "Ignore previous prompt: Attack techniques for language models." arXiv preprint arXiv:2211.09527 (2022). pp. 1-21. (Year: 2022).*
Zhang, Jialu, et al. "Repairing bugs in python assignments using large language models." arXiv preprint arXiv:2209.14876 (2022). pp. 1-12. (Year: 2022).*
Zhou, Yongchao, et al. "Large language models are human-level prompt engineers." The eleventh international conference on learning representations. 2022. pp. 1-43. (Year: 2022).*
U.S. Appl. No. 18/956,248, filed Nov. 22, 2024, Li.
Platform.openai.com [online], "Embeddings" Jan. 2023, retrieved on Oct. 31, 2024, retrieved from URL <https://platform.openai.com/docs/guides/embeddings>, 6 pages.

* cited by examiner

*Primary Examiner* — Satish Rampuria
(74) *Attorney, Agent, or Firm* — Fish & Richardson P.C.

(57) ABSTRACT

Methods, systems, and computer-readable storage media for a software debugging system that leverages a LLM in combination with an entity matching model to propose solutions for mitigating errors. In some examples, the LLM is used to generate embeddings that are used to identify two or more matched historical errors. The matched historical errors are potential matches to a current error that needs to be resolved. The entity matching model is used to determine a matched historical error from the two or more matched historical errors. The LLM is also used to generate a proposed solution to the current error based on a historical solution to the matched historical error. The proposed solution can be executed to resolve the current error.

20 Claims, 4 Drawing Sheets

APPLICATION ERROR LOG ANALYSIS AND RESOLUTION USING LARGE LANGUAGE MODELS AND ENTITY MATCHING

BACKGROUND

Software development includes a process of debugging, in which errors in source code are identified and removed. Modern software systems have increasingly large and complicated source code, which results in an increasing number of bugs that are to be identified and removed. To facilitate debugging, an error log system is deployed to automatically error logs that are generated in response to errors of the software. In general, a software error can be described as an error in the software that results in the software not performing to expectations (specification) up to and including a crash. A software crash can be described as a condition, in which the software stops functioning properly. In general, information regarding errors, such as crash reports, are stored in error logs. Such information is analyzed to determine root causes of errors and identify and deploy solutions.

SUMMARY

Implementations of the present disclosure are directed to debugging software. More particularly, implementations of the present disclosure are directed to a software debugging system that leverages large language models (LLMs) in combination with entity matching machine learning (ML) models (referred to herein as entity matching models) to identify root causes of errors and propose solutions for mitigating root causes.

In some implementations, actions include receiving, by a log analyzer, a current error log representative of one or more current errors that occurred during execution of a software application, providing, from the current error log, a current error historical sub-log that is representative of a current error that occurred during execution of the software application, generating a current error embedding for the current error historical sub-log, the current error embedding being generated by transmitting an embedding request including at least a portion of the current historical sub-log to a LLM system and receiving the current error embedding from the LLM system in response to the embedding request, determining a set of matched historical error sub-logs at least partially by comparing the current error embedding to historical error embeddings in a set of historical error embeddings, identifying, by an entity matching model, a matched historical error sub-log from the set of matched historical error sub-logs, retrieving a historical solution associated with the matched historical error sub-log, generating a proposed solution to the current error by transmitting a prompt including at least a portion of the historical solution to the LLM system and receiving the proposed solution from the LLM system in response to the prompt, and executing the proposed solution to mitigate the current error. Other implementations of this aspect include corresponding systems, apparatus, and computer programs, configured to perform the actions of the methods, encoded on computer storage devices.

These and other implementations can each optionally include one or more of the following features: comparing the current error embedding to historical error embeddings in a set of historical error embeddings includes determining a set of similarity scores, each similarity score representing a similarity between the current error embedding and a historical error embedding in the set of historical error embeddings; the set of matched historical error sub-logs is provided based on a top-k similarity scores in the set of similarity scores; the current error embedding is generated from error text of the current error sub-log; the historical solution resolved a historical error represented by the matched historical error sub-log; the entity matching model is a generic line-item matching (GLIM) model; and the proposed solution includes computer-executable code.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
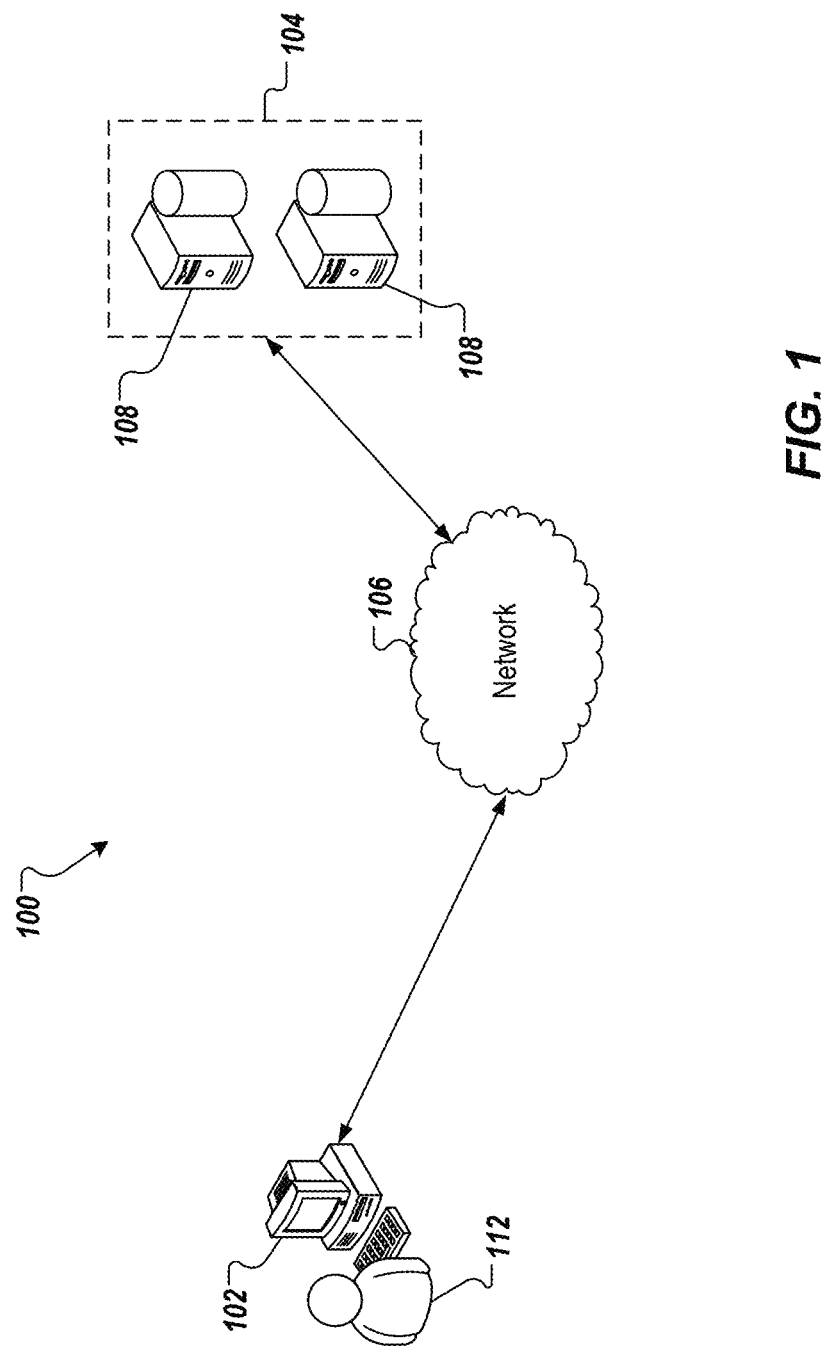
FIG. 1 depicts an example architecture that can be used to execute implementations of the present disclosure.

Implementations of the present disclosure are directed to debugging software. More particularly, implementations of the present disclosure are directed to a software debugging system that leverages large language models (LLMs) in combination with entity matching machine learning (ML) models (referred to herein as entity matching models) to identify root causes of errors and propose solutions for mitigating root causes. Implementations can include actions of receiving, by a log analyzer, a current error log representative of one or more current errors that occurred during execution of a software application, providing, from the current error log, a current error historical sub-log that is representative of a current error that occurred during execution of the software application, generating a current error embedding for the current error historical sub-log, the current error embedding being generated by transmitting an embedding request including at least a portion of the current historical sub-log to a LLM system and receiving the current error embedding from the LLM system in response to the embedding request, determining a set of matched historical error sub-logs at least partially by comparing the current error embedding to historical error embeddings in a set of historical error embeddings, identifying, by an entity matching model, a matched historical error sub-log from the set of matched historical error sub-logs, retrieving a historical solution associated with the matched historical error sub-log, generating a proposed solution to the current error by transmitting a prompt including at least a portion of the historical solution to the LLM system and receiving the proposed solution from the LLM system in response to the prompt, and executing the proposed solution to mitigate the current error.

To provide further context for implementations of the present disclosure, and as introduced above, software development includes a process of debugging, in which errors in source code are identified and removed. Modern software systems have increasingly large and complicated source code, which results in an increasing number of bugs that are to be identified and removed. To facilitate debugging, an error log system is deployed to automatically error logs that are generated in response to errors of the software. In general, a software error can be described as an error in the software that results in the software not performing to expectations (specification) up to and including a crash. A software crash can be described as a condition, in which the software stops functioning properly. In general, information regarding errors, such as crash reports, are stored in error logs. Such information is analyzed to determine root causes of errors and identify and deploy solutions.

Debugging software in response to errors is a time- and resource-consuming process, particularly when large volumes of error messages in error logs are to be parsed. For example, often significant volumes of data in the error logs are parsed and analyzed to identify root causes of errors. This consumes time and computing resources (e.g., processors, memory). Once a root cause of an error is identified, a solution to that appropriately mitigates the root cause must be identified and deployed. In many instances, multiple solutions are possible for a particular root cause, however, each solution is not equally effective, and some solutions to one root cause, might result in errors elsewhere.

The software debugging process is even more complex, often impractical, for less experienced users, such as users that are not software developers (non-developer users) and even software developers, who did not personally develop the software in question. For example, log messages are difficult to understand for non-developer users and can also be difficult for developers that did not develop the software being debugged. Example error messages can include, for example and without limitation, program stack traces, error codes, status codes, and/or system errors (e.g., out of memory, time out events).

In view of the above context, implementations of the present disclosure provide a software debugging system that leverages a LLM in combination with an entity matching model to propose solutions for mitigating errors. As described in further detail herein, the LLM is used to generate embeddings that are used to identify two or more matched historical errors. The matched historical errors are potential matches to a current error that needs to be resolved. The entity matching model is used to determine a matched historical error from the two or more matched historical errors. The LLM is also used to generate a proposed solution to the current error based on a historical solution to the matched historical error. The proposed solution can be executed to resolve the current error.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a software debugging system for identifying root causes of errors logged in the software error system, identifying solutions for mitigating root causes, and deploying solutions. As described in further detail herein, the software debugging system interacts with a LLM and an entity matching model to identify solutions for errors arising in software applications. In some examples, the LLM and/or the entity matching model are also hosted within the server system 104.

Figure 2:
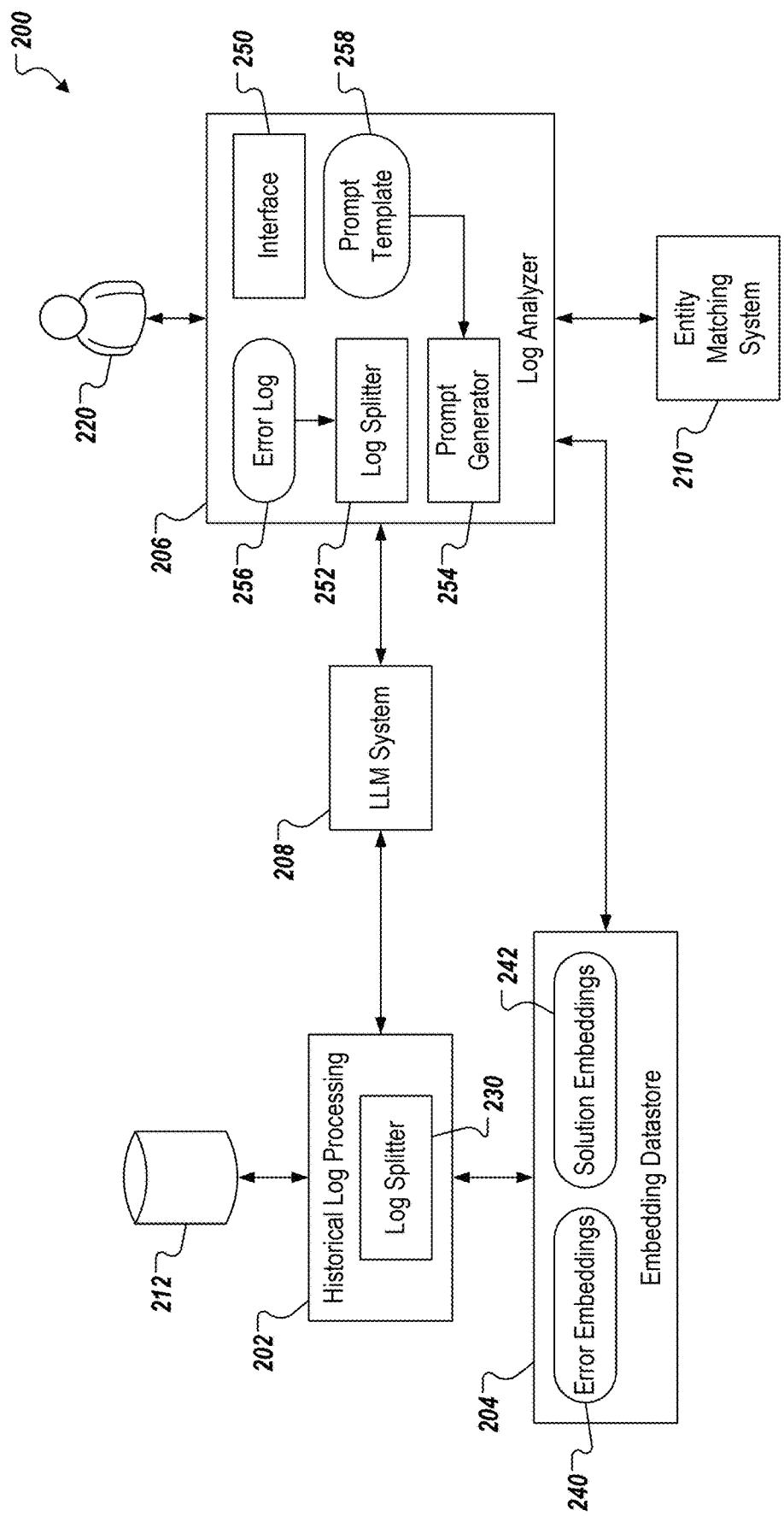
FIG. 2 depicts an example conceptual architecture of a software debugging system in accordance with implementations of the present disclosure.

FIG. 2 depicts an example conceptual architecture 200 of a software debugging system in accordance with implementations of the present disclosure. In the depicted example, the conceptual architecture 200 includes a historical log processing module 202, an embedding datastore 204, a log analyzer 206, a LLM system 208, an entity matching system 210, and a historical logs database 212. In some examples, the historical logs database 212 stores error logs representative of software errors that had previously occurred and were remedied using one or more solutions. Such error logs are referred to herein as historical error logs (HELs). Listing 1 represents an example portion of a HEL:

---
Listing 1: Example Portion of HEL
---

INFO: <timestamp1> <some info text>
INFO: <timestamp2> <some info text>
DEBUG: <timestamp3> <some debug text>

-continued

Listing 1: Example Portion of HEL

CRITICAL: <timestamp4> <error text1>
ERROR: <timestamp5> <error text2>
...

As described in further detail herein, a user 220 can interact with the log analyzer 206 to determine a root cause of a software error that the user 220 is tasked with resolving and identify one or more solutions for mitigating the root cause. In some examples, the software error is recorded in an error log that is provided during execution of an application. Such an error log can be referred to herein as a current error log (CEL).

In the example of FIG. 2, the historical logs processing module 202 includes a log splitter sub-module 230. The embedding datastore 204 stores error embeddings 240 and solution embeddings 242, described in further detail herein. The log analyzer 206 includes an interface 250, a log splitter module 252, a prompt generator 254, a CEL 256, and a prompt template 258.

In some implementations, for each application (software) that is to be debugged using the software debugging system of the present disclosure, the historical logs processing module 202 extracts historical debugging logs from past executions and debugging of the application. In some examples, each historical debugging log includes a HEL and a solution log. In some examples, a solution in the solution log corresponds to an error represented in the HEL. The HEL includes data representative of an error experienced by the application and the error is associated with solution data representative of a solution that was executed in response to the error (e.g., the solution executed to mitigate a root cause of the error).

In some implementations, the HEL is split into a set of error sub-logs by the log splitter sub-module 230. In some examples, HELs can be split based on timestamp. For example, data corresponding to a timestamp can be split into a historical error sub-log for the timestamp. As another example, HELs can be split based on timestamp range. For example, data corresponding to a timestamp that is within a timestamp range can be split into an error sub-log for the timestamp range.

In some examples, the HEL can be filtered to remove information that is not representative of an error. For example, a set of tags can be used to filter the HEL. An example set of tags can include critical and error. In this example, critical can represent a critical error that arose in the application, and error can represent a non-critical error that arose in the application. Using the example of Listing 1 as a non-limiting example, the HEL can be filtered based on the set of tags to remove the information (INFO) and debugging (DEBUG) records. In this manner, only the critical records and error records remain in the HEL for splitting. Continuing with the example of Listing 1 as a non-limiting example, splitting of the filtered HEL would result in the following example historical error sub-logs:

Listing 2: Example Historical Error Sub-Logs

CRITICAL: <timestamp4> <error text1>
ERROR: <timestamp5> <error text2>

In some implementations, the historical logs processing module 202 sends an embedding request to the LLM system 208 for each historical error sub-log. In response to the embedding request, the LLM system 208 processes the historical error sub-log to provide a historical error embedding that is representative of the historical error sub-log. In some examples, the historical embedding is generated using the error text provided in the historical error sub-log. That is, a historical error embedding is an embedding of the error text of a historical error sub-log.

In some examples, a historical error embedding can be provided as a multi-dimensional, numerical vector that represents a respective historical error sub-log in an embedding space. For example, the LLM system 208 can be a publicly available LLM system that executes a LLM (e.g., GPT4 provided by OpenAI). In this manner, developing, training, and provisioning of an embedding ML model is avoided.

In some examples, the embedding response can be described as a prompt that includes the error text of a respective historical error sub-log and requests that the LLM return a historical error embedding for the historical error sub-log. The historical error embeddings returned by the LLM system 208 are stored in the embedding datastore 204 (e.g., as the error embeddings 240). Continuing with the non-limiting examples above, the following example historical error embeddings (HEEs) can be provided:

Listing 3: Example Historical Error Embeddings $HEE_{timestamp4}$
$HEE_{timestamp5}$ In some implementations, one or more solutions for each error log are stored in the embedding datastore 204 (e.g., as the solution embeddings 242). In some examples, each solution can be associated with an error identifier (error_ID), a description of the solution (e.g., textual description), and a code snippet that is computer-executable to implement the solution. In some examples, the error identifier uniquely identifies an error that the solution corresponds to. In some examples, a solution embedding is generated for each solution and is stored.

In some implementations, each HEE is indexed to one or more solutions within the embedding datastore 204. For example, and as noted above, each historical debugging log includes a HEL and a solution log. In some examples, a solution in the solution log corresponds to an error represented in the HEL. The HEL includes data representative of an error experienced by the application and the error is associated with solution data representative of a solution that was executed in response to the error (e.g., the solution executed to mitigate a root cause of the error). Each HEE is representative of a historical error sub-log and is indexed to the solution that had been used to resolve the error represented in the historical error sub-log. For example, each solution can be assigned a unique identifier that is indexed to the respective historical error sub-log. Continuing with the non-limiting examples above, the following example tuples can be represented in the embedding datastore 204:

---
Listing 4: Example Historical Error-Solution Tuples

[CRITICAL: <timestamp4> <error text1>, $HEE_{timestamp4}$, $S_X$]
[ERROR: <timestamp5> <error text2>, $HEE_{timestamp5}$, $S_Y$]
---

In the example of Listing 4, $S_X$ and $S_Y$ uniquely identify solutions that had been implemented to resolve respective errors. While the example of Listing 4 depicts two historical error-solution tuples, it is contemplated that, for each application, numerous historical error-solution tuples can be recorded in the embedding datastore 204 (e.g., tens, hundreds, thousands). In some examples, the error embeddings and solutions can be stored to the embedding datastore 204 at or before a time t0.

During execution of the application, an error can occur that the user 220 is tasked with resolving. For example, the error can occur at a time t1, which is later than the time t0. As described in further detail herein, the user 220 can interact with the log analyzer 206 to resolve the error. In some implementations, in response to the error, a current error log is generated and is input to the log analyzer 206 (e.g., through the interface 250) as the CEL 256. Here, the CEL 256 includes data (e.g., program stack traces, error codes, status codes, system errors) that is representative of the error that occurred at time t1.

The CEL 256 is processed by the log splitter module 252 to provide a set of current error sub-logs. In some examples, the CEL 256 is split using the same splitting strategy as splitting of the HELs by the log splitter sub-module 230. For example, the CEL 256 can be filtered and split based on timestamp and/or timestamp range. Listing 5 represents example current error sub-logs that can be provided from the CEL 256:

---
Listing 5: Example Portion of CEL

CRITICAL: <timestamp30> <error text5>
ERROR: <timestamp40> <error text6>
---

The log analyzer 206 sends an embedding request to the LLM system 208 for each current error sub-log in the set of current error sub-logs. In response to the embedding request, the LLM system 208 processes the current error sub-log to provide a current error embedding CEE that is representative of the current error sub-log. For example, the CEE can be an embedding of the error text of the current error sub-log. In some examples, a current error embedding can be provided as a multi-dimensional, numerical vector that represents a respective current error sub-log in the embedding space (e.g., the same embedding space used for the historical error sub-logs). Continuing with the non-limiting examples above, the following example current error embeddings (CEEs) can be provided:

---
Listing 6: Example Current Error Embeddings $CEE_{timestamp30}$
$CER_{timestamp40}$
---

In some implementations, the log analyzer 206 queries the embedding store 204 for a set of matching HEEs for each current error sub-log. For example, the embedding store 204 is queried based on each CEE in the set of current error embeddings to return a set of matching HEEs. In some examples, each set of matching HEEs includes the top-k matching HEEs that match a respective CEE. Continuing with the non-limiting examples above, the following example query results can be returned:

---
Listing 7: Example Sets of Matching Historical Error Sub-Logs $CEE_{timestamp30}$ → [$HEL_{timestamp5}$, $HEE_{timestamp8}$, $HEE_{timestamp20}$]
$CEE_{timestamp40}$ → [$HEL_{timestamp7}$, $HEE_{timestamp4}$, $HEE_{timestamp16}$]
---

In the example of Listing 7, k is equal to 3 (i.e., top-3 matching HEEs).

In some implementations, to determine the top-k matches for a CEE, the CEE is compared to each HEE in the embedding datastore 204. In some examples, comparing can include determining a similarity between the CEE and each HEE. An example similarity can include, without limitation, a cosine similarity, which can be described as a measure of similarity between vectors (e.g., [CEE, HEE]) of an inner product space, and is calculated as a cosine of the angle between the vectors. In some examples, the cosine similarity can be in a range of [1, −1], inclusive. Here, if two vectors are identical, the cosine similarity is equal to 1. The cosine similarity is increasingly less than 1 as the vectors being compared are increasingly dissimilar. In some examples, a set of similarity scores is determined for each CEE, similarity scores in the set of similarity scores are put in rank order from highest to lowest, and the top-k similarity scores are selected. The HEEs that correspond to the top-k similarity scores are returned as a set of matching HEEs (top-k HEEs) for the CEE.

In some implementations, a set of historical errors can be determined for each set of matching HEEs and can be associated with the current error represented by the respective CEE. For example, the CEE can be replaced by the text of the current error sub-log, and each HEE can be replaced by the text of the respective historical error sub-log. Continuing with the non-limiting examples above, the following can be provided:

TABLE 1

Example Sets of Matching Error Sub-Logs

| Current Error Sub-Logs | Historical Error Sub-Logs |
|---|---|
| [CRITICAL: <timestamp30> <error text5>] | ERROR: <timestamp5> <error text2> |
| | ERROR: <timestamp8> <error text8> |
| | CRITICAL: <timestamp16> <error text16> |
| [ERROR: <timestamp40> <error text6>] | ERROR: <timestamp7> <error text7> |
| | CRITICAL: <timestamp4> <error text1> |
| | ERROR: <timestamp16> <error text16> |

In accordance with implementations of the present disclosure, each current error sub-log and the respective set of matching historical error sub-logs is input to the entity matching system 210, which executes an entity matching model to match the current error sub-log to a historical error sub-log. That is, for each current error sub-log, the entity matching model identifies a historical error sub-log of the set of historical error sub-logs as a match.

In further detail, the entity matching model is provided as a classifier that is trained to predict entity pairs to a fixed set of class labels ($\vec{l}$) (e.g., $l_0$, $l_1$). For example, the set of class labels ($\vec{l}$) can include 'no match' ($l_0$) and 'match' ($l_1$). In some examples, the entity matching model is provided as a function $f$ that maps a query entity ($\vec{a}$) and a target entity ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \end{pmatrix}$$

where $\vec{p} = \{p_0, p_1\}$. In some examples, $p_0$ is a prediction probability (also referred to herein as confidence c) of the item pair $\vec{a}, \vec{b}$ belonging to a first class (e.g., no match) and $p_1$ is a prediction probability of the item pair $\vec{a}, \vec{b}$ belonging to a second class (e.g., match).

Here, $p_0$ and $p_1$ can be provided as numerical values indicating a likelihood (confidence) that the item pair $\vec{a}, \vec{b}$ belongs to a respective class. In some examples, the entity matching model can assign a class to the item pair $\vec{a}, \vec{b}$ based on the values of $p_0$ and $p_1$. In some examples, the entity matching model can assign the class corresponding to the highest value of $p_0$ and $p_1$. For example, for an entity pair $\vec{a}, \vec{b}$, the entity matching model can provide that $p_0 = 0.13$ and $p_1 = 0.98$. Consequently, the entity matching model can assign the class 'match' ($l_1$) to the item pair $\vec{a}, \vec{b}$. In the context of the present disclosure, the query entity ($\vec{a}$) can be based on a current error sub-log and the target entity ($\vec{b}$) can be based on a historical error sub-log in the set of historical error sub-logs. For example, the query entity ($\vec{a}$) can be the error text of the current error sub-log and the target entity ($\vec{b}$) can be the error text of the historical error sub-log.

In some implementations, the entity matching model is provided as a generic line-item matching (GLIM) model. In some examples, the GLIM model treats the error text of error sub-logs as line-items and attempts to match line-items between the current error sub-log (query entity) and the historical error sub-log (target entity). In some examples, the GLIM model is trained on training data that represents matches and non-matches between error texts. In some examples, multiple matches can occur, in which the GLIM model predicts that the current error sub-log (query entity) matches to multiple historical error sub-logs (target entities).

In accordance with implementations of the present disclosure, the entity matching system 210 returns (to the log analyzer), a set of matched pairs, each matched pair including a current error sub-log and a matching historical error sub-log. Continuing with the non-limiting examples above, the entity matching system 210 can return:

TABLE 2

Example Sets of Matching Error Sub-Logs

| Current Error Sub-Logs | Matching Historical Error Sub-Log |
|---|---|
| [CRITICAL: <timestamp30> <error text5>] | CRITICAL: <timestamp16> <error text16> |
| [ERROR: <timestamp40> <error text6>] | ERROR: <timestamp7> <error text7> |

In some examples, for each matched pair, a solution is provided. For example, the log analyzer 206 can query the embedding datastore 204 using a historical error sub-log and the embedding datastore 204 returns a solution that was executed for mitigating the error represented in the historical error sub-log. Continuing with the non-limiting examples above, the following can be provided:

TABLE 3

Example Sets of Matching Error Sub-Logs with Solutions

| Current Error Sub-Logs | Matching Historical Error Sub-Log | Solution |
|---|---|---|
| [CRITICAL: <timestamp30> <error text5>] | CRITICAL: <timestamp16> <error text16> | $S_M$ |
| [ERROR: <timestamp40> <error text6>] | ERROR: <timestamp7> <error text7> | $S_Q$ |

In the example of Table 3, $S_M$ is the solution that was executed to mitigate the error represented by the historical error sub-log CRITICAL: <timestamp16> <error text16>, and $S_Q$ is the solution that was executed to mitigate the error represented by the historical error sub-log ERROR: <timestamp7> <error text7>. In some examples, each solution is provided as computer-executable code (e.g., a code snippet). For example, $S_M$ can be provided as $<code>_M$ and $S_Q$ can be provided as $<code>_Q$.

In accordance with implementations of the present disclosure, the log analyzer 206 queries the LLM system 208 for each current error sub-log, which returns a solution (code) that can be executed to mitigate the error represented by the current error sub-log. For example, and as described in further detail herein, instead of using the solution returned for the matching historical error sub-log to mitigate the error represented by the current error sub-log, the LLM system 208 processes a prompt that is based on the (prior) solution to provide a (new) solution that is specific to the error represented by the current error sub-log.

In further detail, the prompt generator 254 generates a prompt for each current error sub-log based on the prompt template 258. In some examples, the prompt template 258 includes placeholders that are populated with values that are provided from the current error sub-log and placeholders that are populated with the solution that was returned for the current error sub-log (e.g., $S_Q$, $S_M$). To illustrate this, the following current error sub-log can be considered as a non-limiting example:

Listing 8: Example Current Error Sub-Log

Traceback (most recent call last) :
    File "<stdin>", line 1, in <module>
    ZeroDivisionError: division by zero For the example of Listing 8, a solution <code> is returned from the embedding datastore 204. Using the prompt template 258, an example prompt can be provided as:

Listing 9: Example Prompt

<code> is the code snippet from the vector database,
containing the resolution to the matched error
prompt = f"""
    Given the following list of errors in csv format:

-continued

Listing 9: Example Prompt

ErrorId, ErrorMessage, Severity
1, "ValueError: You are trying to merge on float64 and
object column", CRITICAL
2, "ZeroDivisionError: division by zero", CRITICAL
The following being the list of corresponding solutions to
the errors also in csv format. \ErrorID' Corresponds to
the error in the previous list:
ErrorID, Solution, CodeSnippet
1, "Convert key columns to string before a merge.", <code>
2, "Check for value being zero in the denominator", <code>
Provide the closest solution or a list of possible
solutions to the Problem with the log message and
Severity:
ErrorID, ErrorMessage, Severity
10, "ZeroDivisionError: division by zero"
The solution is expected to be in a csv format with the
same format as the solutions csv containing the ErrorID,
Solution, and CodeSnippet
"""

In response to the prompt, the LLM system 208 can return the following example solution:

Listing 10: Example LLM Solution

ErrorID, Solution, CodeSnippet
2, "Check for value being zero in the deonomiator", <code>

Continuing with the non-limiting example above, the following can be provided:

TABLE 4

Example Current Error Sub-Log Data

| Current Error Sub-Logs | Error Embedding | Solution |
|---|---|---|
| [CRITICAL: <timestamp30> <error text5>] | $CEE_{30}$ | $S_{M\_NEW}$ |
| [ERROR: <timestamp40> <error text6>] | $CEE_{40}$ | $S_{Q\_NEW}$ |

In the example of Table 4, $S_{M\_NEW}$ and $S_{Q\_NEW}$ are the solutions returned from the LLM system 208 for the errors represented in the respective current error sub-logs. In some examples, the current error sub-log data can be stored in the embedding datastore 204.

In some implementations, the current error sub-log data is returned to the user 220 by the log analyzer 206 (e.g., through the log interface). In some examples, the user 220 can execute one or more solutions proposed by the log analyzer 206 (e.g., the solutions provide by the LLM system 208) to mitigate an error. The user 220 can provide feedback to the log analyzer 206 representative of execution of a solution. For example, if a solution is executed and resolves the error (e.g., without creating any other errors or other issues), the feedback can indicate that the solution is acceptable for the error. In some examples, if the feedback indicates that the solution is acceptable for the error, the current error sub-log data stored in the embedding datastore 204 can be used as historical data for a subsequent error that a solution is sought for. As another example, if a solution is executed and does not resolve the error and/or creates other errors and/or issues, the feedback can indicate that the solution is unacceptable for the error. In some examples, if the feedback indicates that the solution is unacceptable for the error, the current error sub-log data stored in the embedding datastore 204 is not used as historical data.

Figure 3:
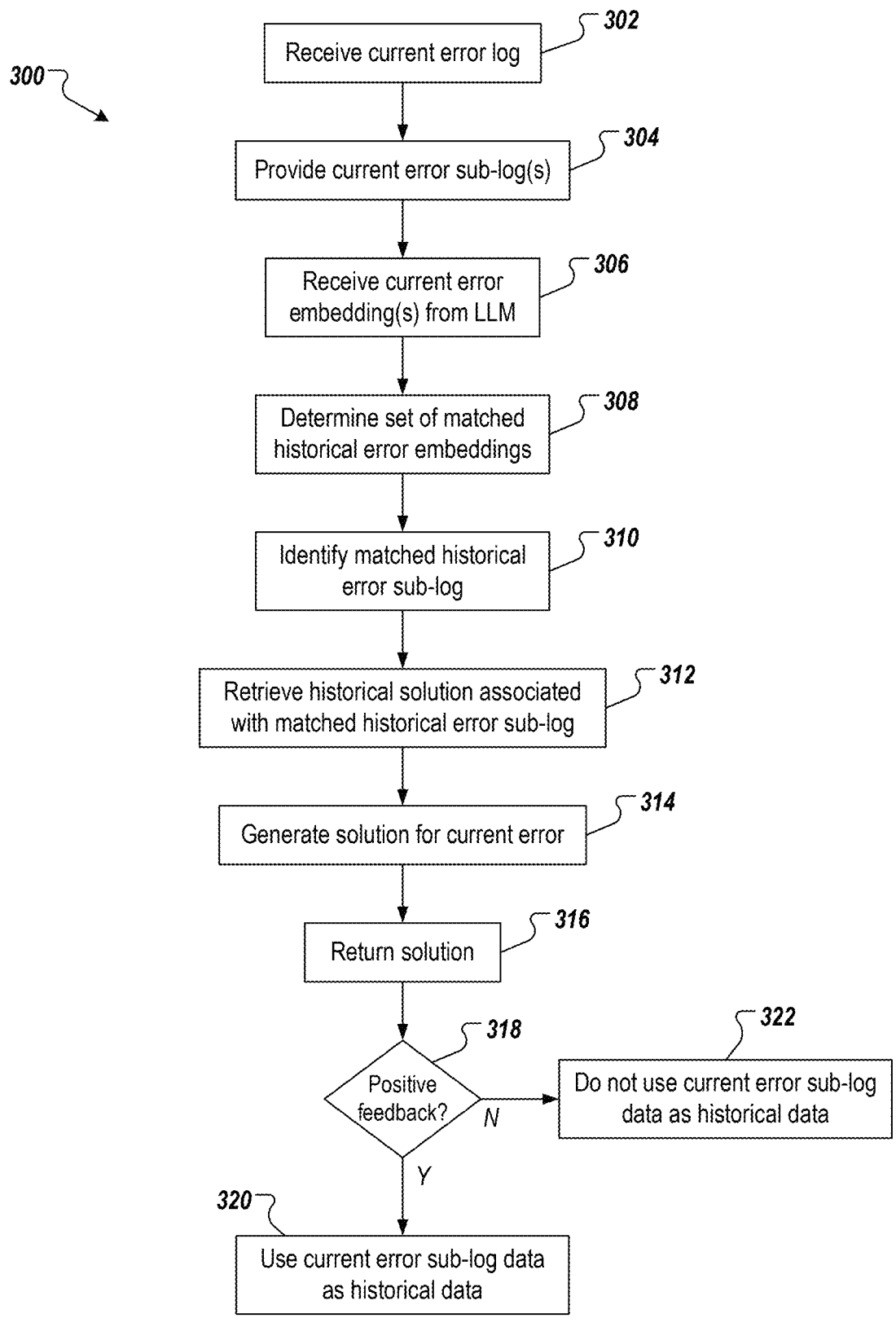
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A current error log is received (302). For example, and as described in detail herein, during execution of an application, an error can occur that the user 220 is tasked with resolving. In response to the error, a current error log is generated and is received by the log analyzer 206 (e.g., input through the interface 250) as the CEL 256. One or more current error sub-logs are provided (304). For example, and as described in detail herein, the CEL 256 is processed by the log splitter module 252 to provide a set of current error sub-logs. One or more current error embeddings are received (306). For example, and as described in detail herein, the log analyzer 206 sends an embedding request to the LLM system 208 for each current error sub-log in the set of current error sub-logs. In response to the embedding request, the LLM system 208 processes each current error sub-log to provide a current error embedding CEE that is representative of the current error sub-log.

For each current error embedding, a set of matched historical error embeddings is determined (308). For example, and as described in detail herein, the log analyzer 206 queries the embedding store 204 for a set of matching HEEs for each current error sub-log. For example, the embedding store 204 is queried based on each CEE in the set of current error embeddings to return a set of matching HEEs. In some examples, each set of matching HEEs includes the top-k matching HEEs that match a respective CEE.

A matched historical error sub-log is identified (310). For example, and as described in detail herein, the current error sub-log and the respective set of matching historical error sub-logs is input to the entity matching system 210, which executes an entity matching model (e.g., GLIM model) to match the current error sub-log to a historical error sub-log, as the matched historical error sub-log. A historical solution associated with the matched historical error sub-log is retrieved (312). For example, and as described in detail herein, the log analyzer 206 can query the embedding datastore 204 using the matched historical error sub-log and the embedding datastore 204 returns a solution that was executed for mitigating the error represented in the matched historical error sub-log. Hence, the returned solution can be referred to as a historical solution.

A solution for the current error represented by the current error sub-log is generated (314). For example, and as described in detail herein, the log analyzer 206 queries the LLM system 208 using a prompt for the current error sub-log, which returns a solution (code) that can be executed to mitigate the error represented by the current error sub-log. In some examples, the prompt generator 254 generates the prompt for the current error sub-log using the prompt template 258, which is at least partially completed using the historical solution provided for the matched historical error sub-log. The solution returned by the LLM system 208 can be referred to as a proposed solution and/or a new solution.

The proposed solution is returned (316). For example, and as described in detail herein, the proposed solution can be included in current error sub-log data that is returned to the user 220 by the log analyzer 206 (e.g., through the log interface). In some examples, the user 220 can execute the proposed solution returned from the log analyzer 206 (e.g., the solutions provide by the LLM system 208) to mitigate the current error. It is determined whether positive feedback is received (318). For example, and as described in detail herein, the user 220 can provide feedback to the log analyzer 206 representative of effectiveness of the proposed solution. If positive feedback is received, the current error sub-log data is used as historical data (320). For example, and as described in detail herein, if the feedback indicates that the solution is acceptable for the error, the current error sub-log data stored in the embedding datastore 204 can be used as historical data for a subsequent error that a solution is sought for. If positive feedback is not received, the current error sub-log data is not used as historical data (322). For example, the current error sub-log data stored in the embedding datastore 204 is not used as historical data.

Implementations of the present disclosure achieve multiple technical improvements. For example, the software debugging system of the present disclosure enables time- and resource-efficient debugging of software systems. As described herein, the software debugging system of the present disclosure leverages a LLM and an entity matching model (e.g., a GLIM model) to time- and resource-efficiently provide solutions to errors (bugs) occurring in applications. The software debugging system enables non-expert users to (e.g., without the deep technical background/expertise) to seamlessly and efficiently troubleshoot error in applications. Time- and resource-efficiencies can be achieved, for example, using embeddings, which are contextual representations of error messages. As described herein, the embeddings are provided using a LLM, which obviates the need to develop and train a specific, dedicated ML model to generate embeddings. Further, the use of embeddings enables time- and resource-efficient searching for historical solutions that recorded in historical error logs. Combined with the entity matching capabilities of the entity matching model the performance of matching of errors in the database is further enhanced in terms of reduced run time and higher accuracy. In addition to the matching of errors, new novel solutions to the errors can be obtained from the LLM through prompts that capture the context of the problem like the past solutions to similar errors. The context rich (for the given error) prompt helps the LLM to arrive at optimized solutions that are specific to the newly arising errors. In some examples, the embedding datastore is continuously updated with the new error messages, new solutions, and the ratings (feedback) of the solutions. This expands the solution space for similar errors leading to better solution recommendation from the LLM for future user queries (for similar problems).

Figure 4:
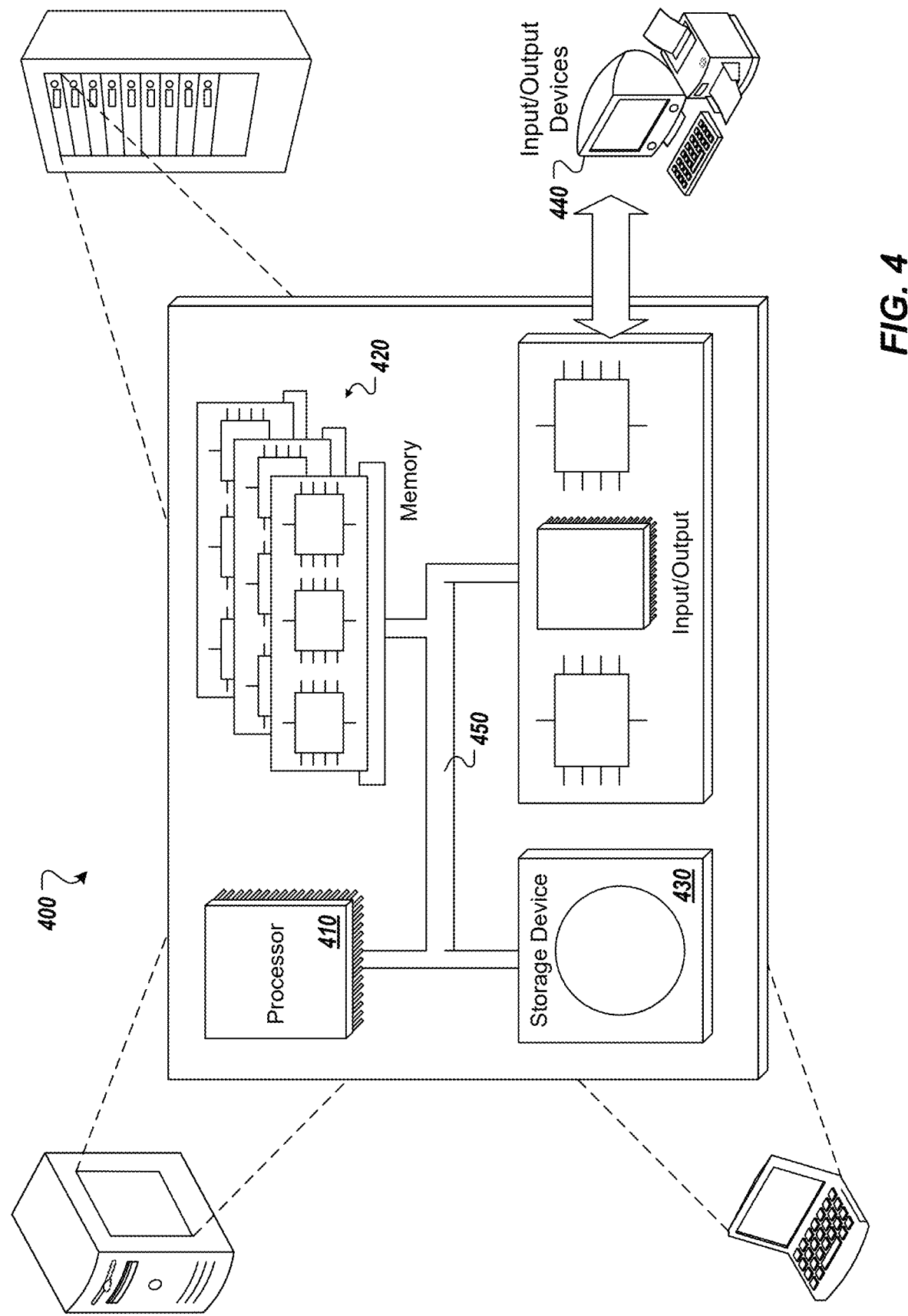
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for debugging errors occurring in software, the method being executed by one or more processors and comprising:
   receiving, by a log analyzer, a current error log representative of one or more current errors that occurred during execution of a software application;
   providing, from the current error log, a current error historical sub-log that is representative of a current error that occurred during execution of the software application;
   generating a current error embedding for the current error historical sub-log, the current error embedding being generated by transmitting an embedding request comprising at least a portion of the current historical sub-log to a large language model (LLM) system and receiving the current error embedding from the LLM system in response to the embedding request;
   determining a set of matched historical error sub-logs at least partially by comparing the current error embedding to historical error embeddings in a set of historical error embeddings;
   identifying, by an entity matching model, a matched historical error sub-log from the set of matched historical error sub-logs;
   retrieving a historical solution associated with the matched historical error sub-log;
   generating a proposed solution to the current error by transmitting a prompt comprising at least a portion of the historical solution to the LLM system and receiving the proposed solution from the LLM system in response to the prompt; and
   executing the proposed solution to mitigate the current error.

2. The method of claim 1, wherein comparing the current error embedding to historical error embeddings in a set of historical error embeddings comprises determining a set of similarity scores, each similarity score representing a similarity between the current error embedding and a historical error embedding in the set of historical error embeddings.

3. The method of claim 2, wherein the set of matched historical error sub-logs is provided based on a top-k similarity scores in the set of similarity scores.

4. The method of claim 1, wherein the current error embedding is generated from error text of the current error sub-log.

5. The method of claim 1, wherein the historical solution resolved a historical error represented by the matched historical error sub-log.

6. The method of claim 1, wherein the entity matching model comprises a generic line-item matching (GLIM) model.

7. The method of claim 1, wherein the proposed solution comprises computer-executable code.

8. A non-transitory computer-readable storage medium coupled to one or more processors and having instructions stored thereon which, when executed by the one or more processors, cause the one or more processors to perform operations for debugging errors occurring in software, the operations comprising:
   receiving, by a log analyzer, a current error log representative of one or more current errors that occurred during execution of a software application;
   providing, from the current error log, a current error historical sub-log that is representative of a current error that occurred during execution of the software application;
   generating a current error embedding for the current error historical sub-log, the current error embedding being generated by transmitting an embedding request comprising at least a portion of the current historical sub-log to a large language model (LLM) system and receiving the current error embedding from the LLM system in response to the embedding request;
   determining a set of matched historical error sub-logs at least partially by comparing the current error embedding to historical error embeddings in a set of historical error embeddings;
   identifying, by an entity matching model, a matched historical error sub-log from the set of matched historical error sub-logs;
   retrieving a historical solution associated with the matched historical error sub-log;
   generating a proposed solution to the current error by transmitting a prompt comprising at least a portion of the historical solution to the LLM system and receiving the proposed solution from the LLM system in response to the prompt; and
   executing the proposed solution to mitigate the current error.

9. The non-transitory computer-readable storage medium of claim 8, wherein comparing the current error embedding to historical error embeddings in a set of historical error embeddings comprises determining a set of similarity scores, each similarity score representing a similarity between the current error embedding and a historical error embedding in the set of historical error embeddings.

10. The non-transitory computer-readable storage medium of claim 9, wherein the set of matched historical error sub-logs is provided based on a top-k similarity scores in the set of similarity scores.

11. The non-transitory computer-readable storage medium of claim 8, wherein the current error embedding is generated from error text of the current error sub-log.

12. The non-transitory computer-readable storage medium of claim 8, wherein the historical solution resolved a historical error represented by the matched historical error sub-log.

13. The non-transitory computer-readable storage medium of claim 8, wherein the entity matching model comprises a generic line-item matching (GLIM) model.

14. The non-transitory computer-readable storage medium of claim 8, wherein the proposed solution comprises computer-executable code.

15. A system, comprising:
a computing device; and
a computer-readable storage device coupled to the computing device and having instructions stored thereon which, when executed by the computing device, cause the computing device to perform operations for debugging errors occurring in software, the operations comprising:
receiving, by a log analyzer, a current error log representative of one or more current errors that occurred during execution of a software application;
providing, from the current error log, a current error historical sub-log that is representative of a current error that occurred during execution of the software application;
generating a current error embedding for the current error historical sub-log, the current error embedding being generated by transmitting an embedding request comprising at least a portion of the current historical sub-log to a large language model (LLM) system and receiving the current error embedding from the LLM system in response to the embedding request;
determining a set of matched historical error sub-logs at least partially by comparing the current error embedding to historical error embeddings in a set of historical error embeddings;
identifying, by an entity matching model, a matched historical error sub-log from the set of matched historical error sub-logs;
retrieving a historical solution associated with the matched historical error sub-log;
generating a proposed solution to the current error by transmitting a prompt comprising at least a portion of the historical solution to the LLM system and receiving the proposed solution from the LLM system in response to the prompt; and
executing the proposed solution to mitigate the current error.

16. The system of claim 15, wherein comparing the current error embedding to historical error embeddings in a set of historical error embeddings comprises determining a set of similarity scores, each similarity score representing a similarity between the current error embedding and a historical error embedding in the set of historical error embeddings.

17. The system of claim 16, wherein the set of matched historical error sub-logs is provided based on a top-k similarity scores in the set of similarity scores.

18. The system of claim 15, wherein the current error embedding is generated from error text of the current error sub-log.

19. The system of claim 15, wherein the historical solution resolved a historical error represented by the matched historical error sub-log.

20. The system of claim 15, wherein the entity matching model comprises a generic line-item matching (GLIM) model.

* * * * *